United States Patent [19]
Downes, Jr. et al.

[11] 3,750,005
[45] July 31, 1973

[54] HIGH EFFICIENCY CONSTANT VOLTAGE TO CONSTANT CURRENT CONVERTER FOR ENERGY STORAGE

[75] Inventors: George R. Downes, Jr., Orlando; Stanley F. Brewer, Winter Park; James E. Murtha, Orlando, all of Fla.

[73] Assignee: The United States of America as represented by the Secretary of the Army

[22] Filed: Sept. 20, 1971

[21] Appl. No.: 181,897

[52] U.S. Cl. ............................................. 321/18
[51] Int. Cl. .......................................... H02m 7/00
[58] Field of Search ...................... 320/1; 321/2, 16, 321/18, 47; 323/43.5 S

[56] References Cited
UNITED STATES PATENTS

| | | | |
|---|---|---|---|
| 3,644,818 | 2/1972 | Paget | 321/18 |
| 3,631,527 | 12/1971 | Splain | 323/43.5 S |
| 3,195,038 | 7/1965 | Fry | 323/43.5 S |
| 3,308,369 | 3/1967 | Torii | 321/16 |
| 3,473,040 | 10/1969 | Cominassi et al. | 321/2 X |

Primary Examiner—William M. Shoop, Jr.
Attorney—Harry M. Saragovitz, Edward J. Kelly et al.

[57] ABSTRACT

A constant voltage to constant current converter for providing a highly efficient charge to energy storage networks is provided. Energy from a power transformer is delivered to a storage capacitor through a tap switching arrangement providing substantial improvement in efficiency. The approximation of a constant current supply is obtained by sequentially seriesing the rectified secondaries of the power transformer as a function of time relative to the state of charge on the capacitor. The direct current voltage across the energy storage device is rapidly increased in gated steps until a desired level of charge is obtained, at which time the charging source is automatically isolated from the energy storage capacitor. When the energy storage capacitor is discharged, a quench function is provided to allow discharge circuit stability and isolation to be obtained before voltage is reapplied to the capacitor bank.

15 Claims, 5 Drawing Figures

George R. Downes Jr.
Stanley F. Brewer
James E. Murtha,
INVENTORS

HIGH EFFICIENCY CONSTANT VOLTAGE TO CONSTANT CURRENT CONVERTER FOR ENERGY STORAGE

BACKGROUND OF THE INVENTION

In general, the most efficient way to charge a capacitor is from a constant current source. The primary power sources usually available are constant voltage sources such as ac power lines or batteries. These power sources can be adapted to provide constant current sources, however these are normally high loss sources of energy. A constant current source derived by varying a resistive element dissipates as much energy as a fixed resistor, approximately 50 percent of the energy drawn from a primary source. Prior art conventional devices have approximately 30-40 percent efficiency due to the inherent losses incurred in resistance-capacitance charging from a fixed voltage source. Higher efficiencies using resonant charging methods have been achieved but only by using larger and heavier components, such as in radar modulators.

SUMMARY OF THE INVENTION

A constant voltage to constant current converter for energy storage network charging is provided which allows efficient energy storage to be obtained. A step charging technique, transistor storage time compensation, and quench-time generation allow the efficient charge of a storage capacitor used to pump the flash tube in a solid state laser. This efficient converter allows the use of small light weight components suitable for portable application and high density packaging, while providing efficiency superior to that obtainable by prior art devices. By using the constant voltage to constant current converter, primary power sources such as alternating current power lines can be adapted to provide low loss constant current sources. The constant current converter overcomes the resistive type of losses of prior art devices by approximating an optimum variation in charging voltage, periodically increasing the output voltage in small increments. For a supply with a certain minimum series charging resistance and a fixed primary voltage source there exists a definite maximum energy that can be drawn from the source in any given time. The efficiency of the constant current source is a function of the fraction of this maximum energy that is actually used and of the number of voltage steps utilized in approximating the voltage variation.

In the constant voltage to constant current converter, a series of timing and control circuits control the initiation of the energy bank charge by gating the output of a high voltage transformer and the termination of this charge after a predetermined time. Upon termination of charge, the charging source is automatically isolated from the energy device. For a laser flash tube or other similar device a quench function is provided to allow the discharge circuit to stabilize and provide isolation before voltage is reapplied to the capacitor bank.

An object of the present invention is to provide a highly efficient, sequentially seriesed current source for charging storage capacitors.

Another object of the present invention is to provide efficient direct current energy storage by using a step charging system, transistor storage time compensation, and quench time generation.

DESCRIPTION OF THE PREFERRED EMBODIMENTS

A power supply system is provided for supplying laser pumping energy and associated control circuit power. The laser energy supply must be supplied to an energy storage device or storage capacitor that delivers power to the laser at a high repetition rate. Energy from a power transformer is delivered to the storage capacitor through a novel tap-switching arrangement providing a substantial improvement in efficiency. Limitations of power transistors determine the upper allowable operating frequency of conversion. It is desirable to have as small a rise time as possible, since a large portion of transistor dissipation is directly related to the ratio of rise time to the total period. Power transistors have inherently long storage time because of their large junction areas. If the output stages are driven with a push-pull square wave, serious overlapping of conduction angles would result from this storage time. Thus, to improve converter efficiency with power transistors a driving signal is generated which allows the conducting side to turn off completely before the other side is turned on.

When charging a capacitor from a fixed voltage through a resistance, which is the equivalent circuit of a battery, a maximum efficiency of 50 percent can be obtained. An efficiency of 100 percent can be approached with a constant current input. HOwever, this constant current must be generated by a varying input voltage as obtained from a transformer, for example, not by resistive means. Approximation of a constant current input is accomplished by sequentially seriesing the rectified secondaries of a transformer output as a function of time, thereby stepping the voltage up incrementally. The overall efficiency of the current supply is then a function of the dc-to-dc efficiency of the converter times the efficiency of the step charging arrangement, providing a nominal efficiency of 75-80 percent. Using step charging for the energy storage device reduces peak current by about 50 percent, improving the overall system efficiency and life time.

Figure 1:
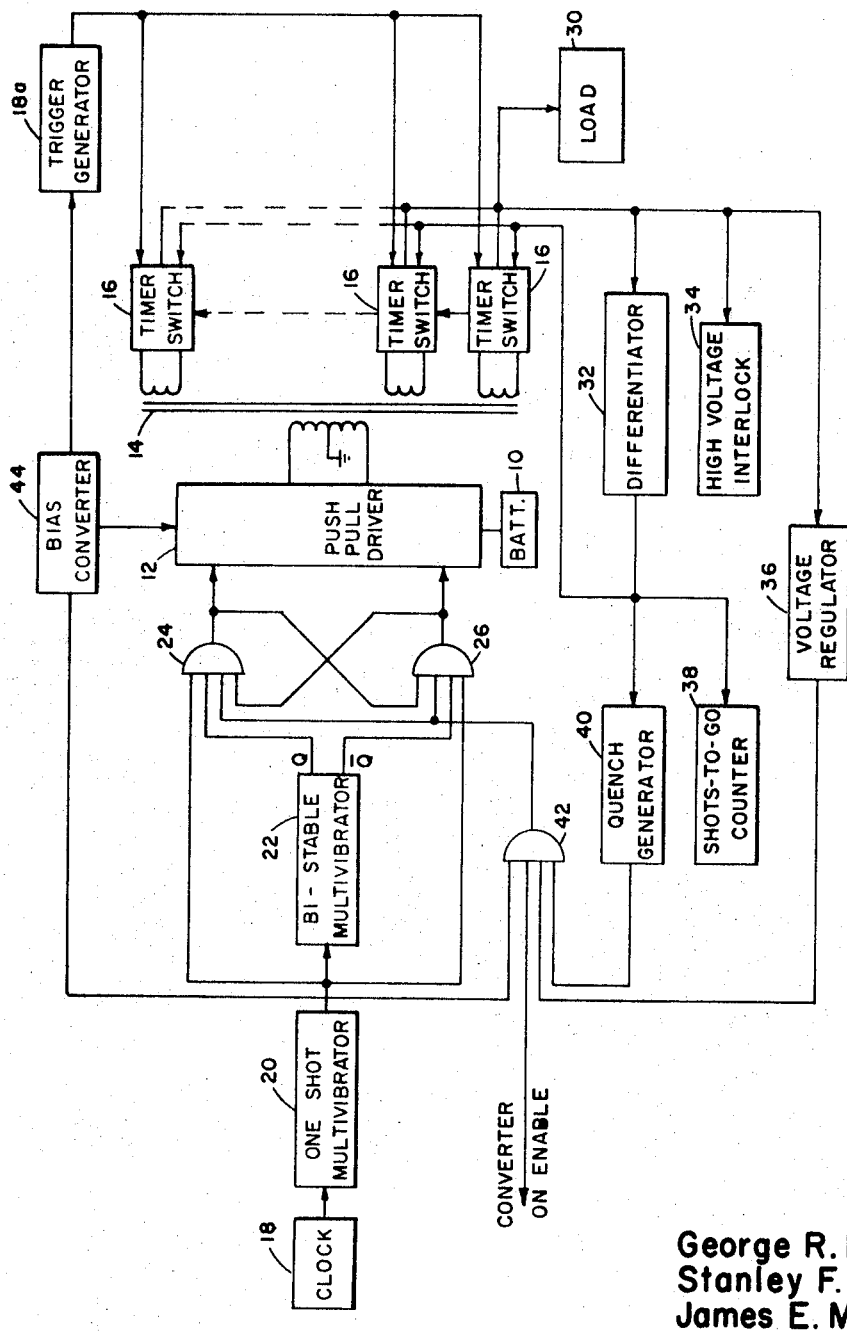
FIG. 1 is an embodiment of the invention employing a direct current power source feeding a push-pull driver system.

In FIG. 1, a power converter block diagram is shown wherein a dc power source 10 provides power to a push-pull driver 12 for coupling through transformer 14 to timer switches 16. Clock 18, a unijunction oscillator operating at twice the converter frequency, drives a single-shot multivibrator 20. Multivibrator 20 generates the dead time between cycles which compensates for storage time within the push-pull power transistors. The single-shot output drives bi-stable multivibrator 22. The output of multivibrator 22 is connected to AND gates 24 and 26. The output from multivibrator 20 is also coupled to gates 24 and 26 which thereby provides a dead time delay. The output of gates 24 and 26 is connected to driver circuit 12 and is also cross-coupled therebetween to prevent the turning on of both drivers simultaneously.

Step charging switches 16 are activated independently of the output voltage by a timing circuit, trigger generator 18a. Switches 16 are coupled to energy storage load 30 for providing the sequential seriesed charging rate thereto. The charge on storage device 30 is coupled to a differentiator 32, a high voltage interlock 34 and a voltage regulator 36. Output signals from differentiator 32 are coupled back to switch 16 and provide a reset signal therefor after each discharge of the energy storage device. The differential output signal also drives a shots-to-go counter 38 and a quench generator 40. The counter 38 indicates the remaining energy in the battery supply 10. An AND gate 42 controls the drive to the power stages by gating gates 24 and 26. Quench generator 40 will remove the drive for a preselected period after each pulse by disabling gate 42. Similarly, regulator 36 removes the drive signal after energy storage device 30 reaches a preset level of charge, providing restored drive if the charge potential falls below the desired level. A bias converter 44 is interlocked with the drive, having outputs connected to gate 42, driver 12 and generator 18a for protecting the power transistors in the event of a bias power failure. The converter ON enable signal for activation thereof is supplied to one of the inputs of AND gate 42.

With energy storage device 30 in a discharged state, receipt of a converter ON enable signal activates gate 42, which in turn activates either gate 24 or 26 depending on the output of bi-stable multivibrator 22. For the Q output of multivibrator 22 gate 24 is activated which activates one side of the push-pull driver 12, amplifying and coupling energy through transformer 14 to timer switches 16. On the next clock pulse the output state of multivibrator 22 is switched to $\bar{Q}$, removing the gating signal from gate 24 and applying the gating signal to gate 26 and thereby switching the push-pull drive to the opposing power transistor. Trigger generator 18a, activates timer switches 16. Timer switches 16 periodically activate to sequentially increase the voltage level applied to the energy storage device or energy storage capacitor 30. When the charge across energy storage device 30 reaches a predetermined level, voltage regulator 36 removes the drive by disabling gate 42. The charge across energy storage device 30 is then dumped into the load, as for example a laser flash tube. After each discharge of storage capacitor 30, differentiator 32 provides an output which resets timer switches 16 and activates quench generator 40 for inhibiting AND gate 42, after which the cycle can be repeated.

Figure 2:
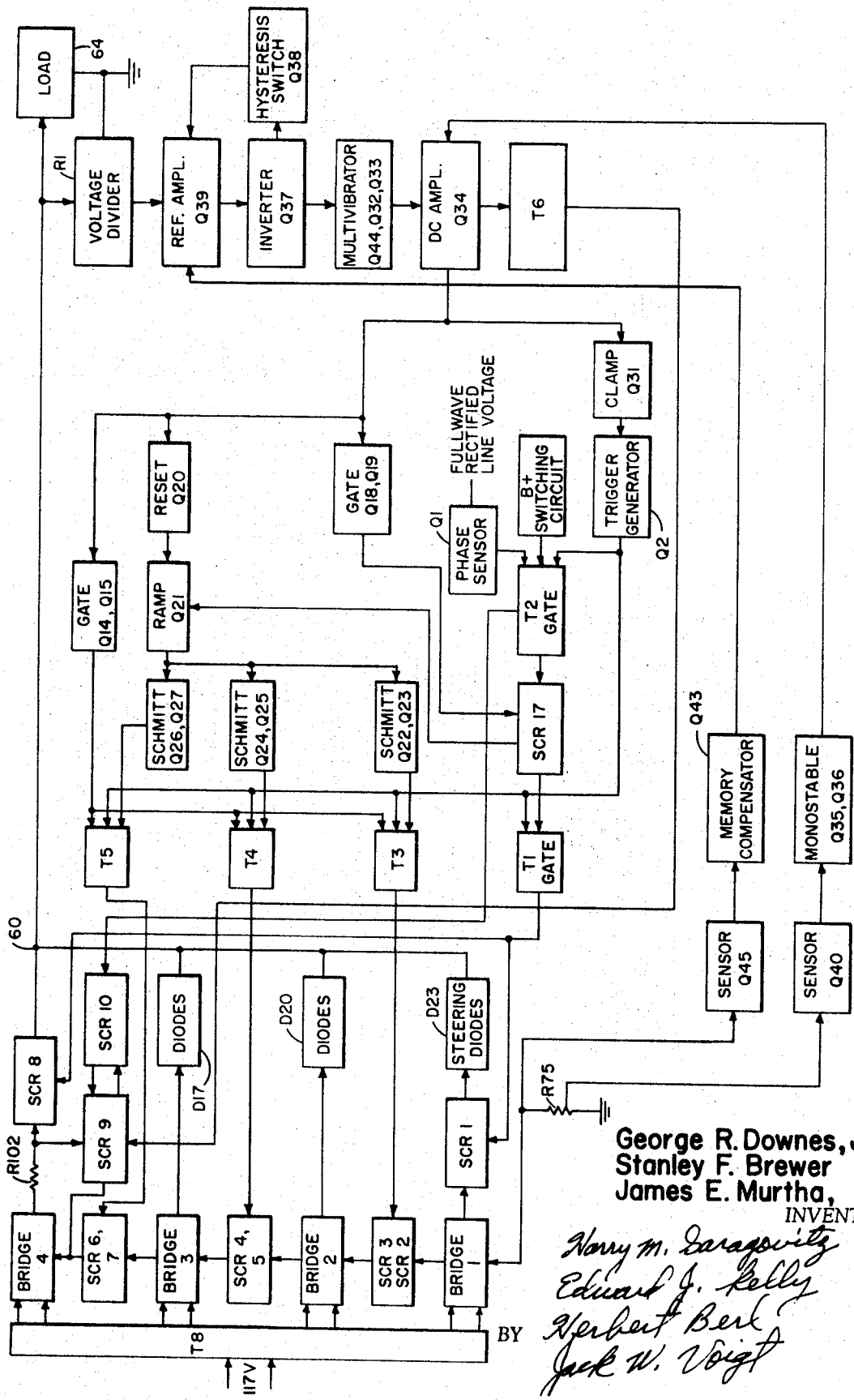
FIG. 2 is a block diagram of a preferred embodiment of the invention employing an alternating current power source.

As shown in FIG. 2, the approximated constant current source is obtained from a ac voltage input source. A high voltage transformer T8 couples the ac signal to diode bridges 1, 2, 3 and 4. Silicon controlled rectifiers (SCR) 2 and 3 connect diode bridges 1 and 2 for sequentially seriesing the rectified output voltage. Similarly, SCR 4 and SCR 5 connect bridges 2 and 3, and SCR 6 and SCR 7 connect bridges 3 and 4. The dc output of each bridge is connected through steering diodes and/or SCR's to a common point 60 on the charging side of an energy storage bank 64. Diode bridge 4 is connected through a low resistance R102 and SCR 8 to common point 60, and bridge 1 is connected through SCR 1 to point 60. These elements form the basic charging circuit for capacitive load 64.

In gating and controlling the power charging circuit, transformer gates T1, T3, T4 and T5 activate SCR's 1-8 at timed intervals. A trigger generator Q2 provides timing pulses simultaneously to gates T1, T3, T4, T5 and to the controlling gate T2. The ac line voltage is also full-wave rectified and filtered to provide B+ for the control circuits. The unfiltered full-wave rectified voltage is coupled to a phase sensitive detector Q1 which provides a gating signal to T2 during each half cycle crossing. With energy storage bank 64 in a discharged condition, generator Q2 and phase sensor Q1 are periodically gating T2 and the circuit is activated when a B+ enable signal is supplied thereto. T2 has an output connected to a switch SCR 17 which is used to initiate the charging cycle by activating T1 gate and simultaneously activating a ramp circuit Q21. Ramp circuit Q21 sequentially activates Schmidt trigger Q22–Q23 which activates gate T3, Schmidt trigger Q24–Q25 which activates gate T4, and Schmidt trigger Q26–Q27 which activates gate T5. Gate T1, connected to SCR 1, allows bridge 1 to activate and after a preselected time delay, gate T3 activates SCR 2 and SCR 3 providing the series connection of bridge 2 with bridge 1 for increasing the voltage output. Similarly gate T4 is connected to SCR 4 and SCR 5 for seriesing bridge 3 with bridges 2 and 1, and SCR's 6 and 7 are gated by T5 to connect bridge 4 into the circuit. A voltage divider R1 is connected across energy bank 64 between terminal 60 and ground, providing a reference potential for activating reference amplifier Q39 when the energy bank obtains the desired potential level. Amplifier Q39 activates monostable multivibrator Q32–Q33 through an inverter Q37. The monostable multivibrator output activates a direct coupled (DC) amplifier Q34 which disables trigger generator Q2 through clamping circuit Q31, disables switch SCR 17 through gate circuit Q18–Q19, disables ramp Q21 through reset circuit Q20 and inactivates the transformer gates through gate circuits Q14–Q15.

The diode bridges have a very low resistance return path from ground through a potentiometer R75. A current sensor Q40, connected to the variable arm of R75, couples an output signal through a monostable multivibrator Q35–Q36 to form a protective circuit which will turn off all triggers and gates if the current in the bridges becomes excessive. The output from multivibrator Q35–Q36 is coupled to DC amplifier Q34 for this purpose. In a charged condition, capacitors exhibit a capacitive variation with time because of dielectric stress. Transistor circuits Q43 and Q45 are used to overcome this "stress" memory of the energy bank. When the bank is charged from ground potential the current peaks in current monitor R75 cause current sensor Q45 to activate Q43, the memory compensator. Q43 momentarily shifts the regulator reference voltage of Q39 slightly. To prevent extremely fast regulation cycling, hysteresis switch Q38 is used to offset the regulator reference after Q39 has been activated.

DC amplifier Q34 is connected through a transformer T6 which provides a turn on pulse to SCR 9 when multivibrator Q32–Q33 change states. SCR 9 is coupled with SCR 10 which is gated by the T2 gate, SCR 10 being gated off when SCR 9 is gated on. These rectifiers operate to stop the capacitor bank charge in response to gating ON of Q34.

Figure 3:
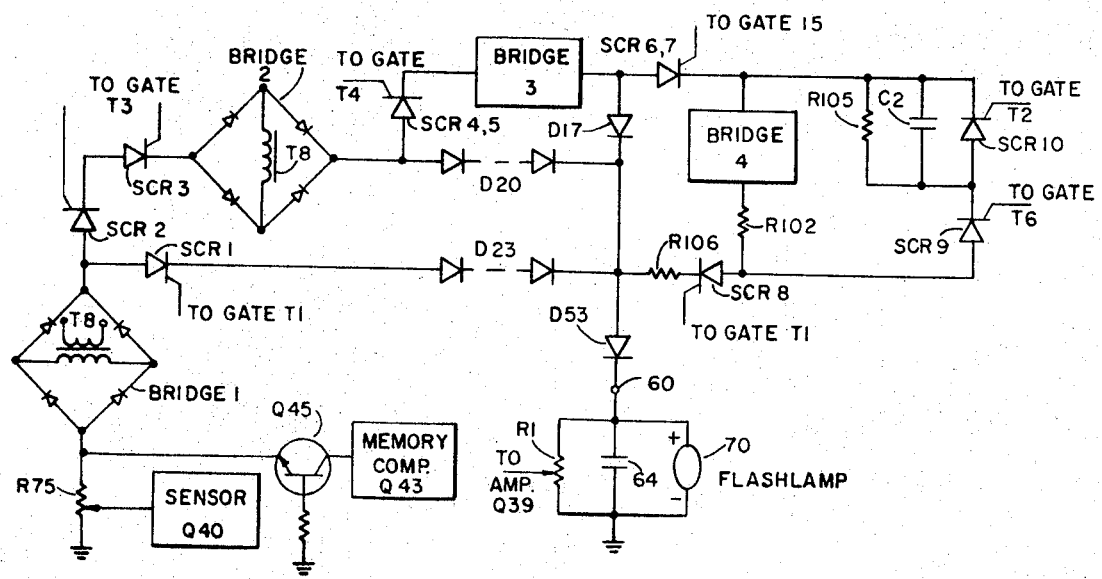
FIG. 3 is a single line diagram of the charging circuitry of FIG. 2.

A single line schematic of the charging circuit of FIG. 2 is shown in FIG. 3. Energy storage capacitor 64 is shown having a load 70 thereacross for discharging therethrough. With only SCR 1 gated, charging current from ground goes through R75, bridge 1, SCR 1, steering diodes 23, diode D53 and back through load capacitor 64. With all of the diode bridges supplying power to the load the path from ground is through R75, bridge 1, SCR 2, SCR 3, bridge 2, SCR 4, SCR 5, bridge 3, SCR 6, SCR 7, bridge 4, R102, SCR 8, R106, and D53. A paralleled capacitor and resistor C2 and R105 are connected in parallel with SCR 10 and in series with SCR 9. SCR 10 being activated initially by T2 keeps C2 in a discharged state during charging of load 64. When load 64 is charged, T2 is gated off deactivating SCR 10 and T6 is gated on, activating SCR 9. Turning on of SCR 9 connects C2 from the anode of SCR 8 to the return leg of bridge 4. The anode voltage of SCR 8 is thereby loaded below its cathode voltage while capacitor C2 charges, the voltage being dropped across the low resistance of R102 between bridge 4 and SCR 8. The time constant is sufficient to stop SCR 8 from conducting, thereby stopping the capacitor bank charge.

Figure 4:
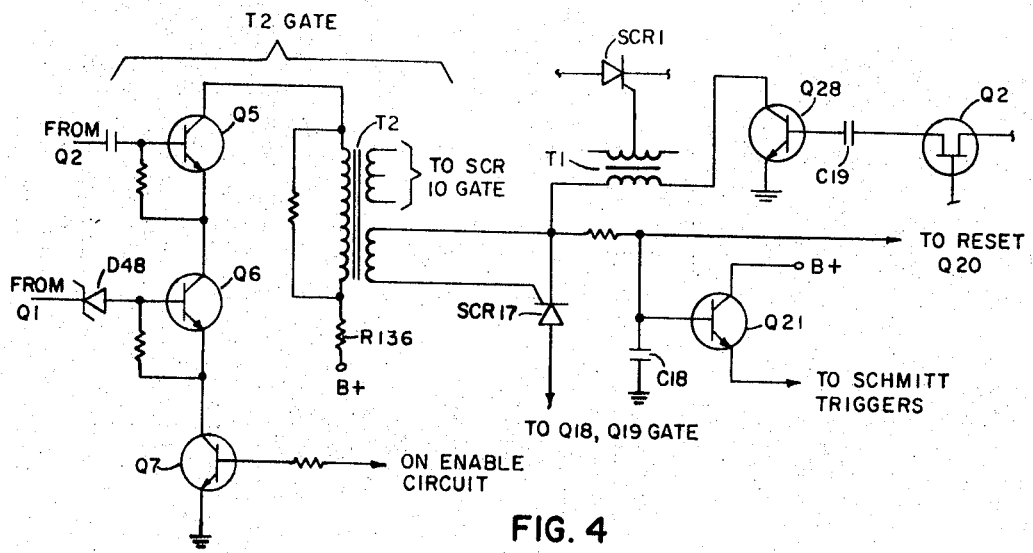
FIG. 4 is a single line diagram of the starting control circuit and gating circuit of FIG. 2.

In FIG. 4 the initial gating circuits are disclosed in single line form. T2 gate, typifying the other gating circuits, discloses three seriesed transistors, Q5, Q6 and Q7 connected through a transformer T2 to B+. Trigger generator Q2 periodically pulses the base of Q5 at a high frequency rate, thereby placing Q5 in a conductive state. When transistor Q1 (not shown) senses a line voltage zero crossing, a signal is coupled through Zener diode D48 to the base of Q6 for activating Q6. Transistor Q7 is activated by B+ being placed on the base when the converter ON enable voltage is supplied to the gate. The secondary output from T2 is connected to the cathode and gate of SCR 17, which supplies B+ for transistor Q28 and T1. Q28 is pulsed from Q2 at the same time and rate that Q5 is gated and the resultant output is used to trigger SCR 1. T2 also turns on SCR 10. SCR 10 as shown in FIG. 3, dumps the regulation capacitor C2 in preparation for the regulation function. Transistor Q21 has the base thereof connected to the cathode of SCR 17 and is activated when SCR 17 conducts, the emitter of Q21 being connected to the Schmidt trigger circuits. A one microfarad capacitor C18 connected between the base of Q21 and ground begins to charge when SCR 17 turns on. The Schmidt trigger circuits are sequentially switched on at preselected intervals thereafter for tieing the associated diode bridges into the charge loop.

Figure 5:
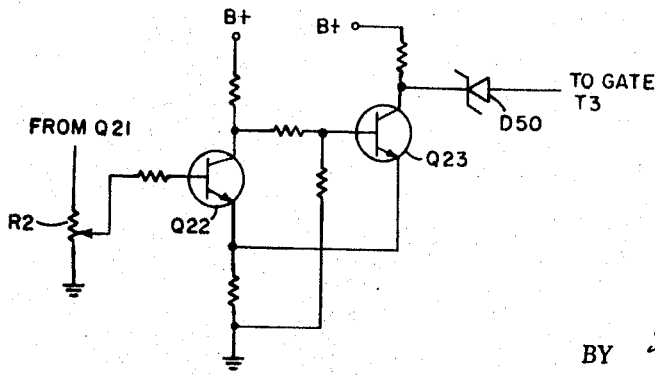
FIG. 5 discloses a typical Schmidt trigger within the system.

FIG. 5 shows a typical Schmidt trigger and coupling thereof to transistor Q21. A potentiometer R2 couples a signal from the emitter of Q21 to the base of Q22. Q22 and Q23 have the emitters thereof tied in common and the collectors tied through resistances to B+. The change of potential on the base of Q23, occurring when Q22 conducts, causes Q23 to turn off and the positive step appearing on the collector of Q23 is coupled through diode D50 to place gate T3 in an active state and allows the trigger from Q2 to be passed through gate T3. Gate T3 then triggers SCR 2 and SCR 3 which ties the second bridge into the charge loop.

In operation of the converter embodiment of FIG. 2 the following sequence occurs, for the capacitor bank initially at discharge. Gate T2 is activated by the B+ enable voltage applied to Q7, with Q6 and Q5 of gate T2 already being in a conductive state merely awaiting coincidence. The output of T2 is applied to SCR 17 allowing SCR 1 to be triggered. SCR 1 turns on and provides, typically, 200 volts dc to the capacitor bank 64. Capacitor C18 at the base of Q21 begins to charge through SCR 17 and Q21 conducts. Potentiometer R2 in the base of Schmidt trigger transistor Q22 is adjusted so the Schmidt trigger is switched in only milliseconds later. The positive step output of Schmidt trigger 23 is passed to gate T3. Gate T3 triggers SCR 2 and SCR 3, tieing the second bridge into the charge circuit, increasing the voltage now available for charging. Operating in the same sequence, Schmidt trigger Q24–Q25 operate to turn on gate T4, SCR 4, and SCR 5 several milliseconds after operation of bridge 2 thereby placing bridge 3 into the charge loop and increasing the charging voltage across capacitor 64. Following in sequence, Schmidt trigger Q26–Q27 activates gate T5 which in turn activates SCR 6 and SCR 7 placing bridge 4 into the charge sequence. During this charging time an indication of the voltage on the energy bank is fed to reference amplifier Q39 by way of resistance R1. When the reference voltage level of Q39 is exceeded, the monostable multivibrator Q32–Q33 changes state due to the clamping action of Q44. Inverter Q37 provides phase inversion between Q39 and Q44. The collector of DC amplifier Q34 swings positive when the multivibrator changes states and is used to perform the following functions: clamp the emitter of Q2 to ground so that no further trigger pulses are generated; remove B+ from T3, T4 and T5 gates, with gate circuit Q14–Q15 functioning as a series regulator and a clamp, respectively, for this purpose; turn off SCR 17, gate circuit Q18–Q19 act as a series regulator and clamp; and dump the one microfarad timing capacitor C18 connected to the base of Q21, Q20 performing as a clamp in this function. Simultaneously T6, connected in the emitter of Q34, provides a turn on pulse to SCR 9 when multivibrator Q32–Q33 changes states. Turn on of SCR 9 connects capacitance C2 from the anode of SCR 8 to the return leg of bridge 4. The anode voltage of SCR 8 is momentarily loaded below its cathode voltage while capacitor C2 charges. This time constant is sufficient to stop SCR 8 from conducting, thereby stopping the capacitor bank charge. The energy storage bank 64 is thereby charged at a sequential rate approximating a constant current charge. When the flash tube or load 70 is fired monostable multivibrator Q32–Q33 performs a quench function. The multivibrator momentarily holds the voltage on the collector of Q34 to allow the flash tube to deionize before voltage is reapplied to the capacitor bank. Transistor Q40 and monostable multivibrator Q35–Q36 form a protective circuit which turns off all triggers and gates if the current in the bridge becomes excessive.

Actual components used in implementation of the invention described hereinabove can be readily scaled either up or down to accommodate a wide range of power and energy requirements. Individual component selection can be optimized for cost, environment, weight and other design considerations. The number of discreet steps used to approximate the optimum variation of voltage with time can be varied to trade off efficiency versus circuit complexity. The techniques used herein are applicable to both dc input supplies and ac input supplies as hereinabove noted.

It is to be understood that the form of the invention, herewith shown and described is to be taken as a pre-

We claim:

1. A high efficiency constant voltage to constant current converter for supplying energy to a storage bank at a high repetition rate and comprising: a power transformer having a plurality of secondary windings, a timing means connected as outputs to each winding for converting the output thereof to direct current and sequentially connecting successive timing means in series with a preceding one, energy storage means connected to an output of each of said timing means for receiving said direct current therefrom, a dc power source, push-pull amplifier means for coupling dc energy from said source to the primary winding of said transformer, gating means for controlling the alternation rate of said push-pull amplifier, and voltage regulating means responsive to the direct current voltage level of said energy storage means for terminating gating drive signals to said push-pull amplifier when said storage means reaches a predetermined voltage level.

2. A constant current converter as set forth in claim 1 and further comprising a differentiator connected to said storage means for providing a reset pulse to said gating means and said timing means in response to discharge of said energy storage means.

3. A constant current converter as set forth in claim 2 wherein said push-pull amplifier means is a driver circuit for said transformer and said energy storage means is capacitance.

4. A constant current converter as set forth in claim 3 wherein said gating means comprises a unijunction oscillator clock, a one-shot multivibrator responsive to said clock, first and second AND gates having respective first inputs responsive to said one-shot multivibrator, a bi-stable multivibrator connected to said one-shot multivibrator output and having first and second outputs connected to respective second inputs of said first and second gates and a third input to said gates being connected in common for receiving a converter enable signal to activate said converter.

5. A constant current converter as set forth in claim 4 wherein said gating means further comprises a third AND gate responsive to said voltage regulator and said converter enable signal for gating said third input of said first and second gates to activate said converter, and wherein said first and second gates have crosscoupled outputs to respective fourth inputs thereof for preventing simultaneous operation thereof.

6. A high efficiency constant voltage to constant current converter for supplying direct current energy to an energy storage means at a high repetition rate and comprising: a power transformer having a plurality of secondary windings, a diode bridge circuit connected to each of said plurality of secondary windings for providing a direct (dc) output therefrom, energy storage means coupled to each of said diode bridges for receiving said dc therefrom, a timing and control means for sequentially connecting succeeding diode bridges in series with a preceeding bridge for increasing the voltage applied across said energy storage means, voltage regulation means responsive to the voltage level developed across said energy storage means for terminating charging currents when said storage means reaches a predetermined level of charge.

7. A constant current converter as set forth in claim 6 wherein said timing and control means comprises at least one silicon controlled rectifier (SCR) serially connecting each adjacent diode bridge, an AND gate coupled to each of said SCR's for gating said rectifiers ON, a transistor delay switching circuit for driving each of said AND gates, and a first transformer coupled AND gate for energizing said delay switching circuit and thereby initiating sequential seriesing of said diode bridges.

8. A constant current converter as set forth in claim 7 wherein said voltage regulator means comprises at least a resistance voltage divider having a variable tap and connected across said energy storage means, and a direct coupled amplifier responsive to a signal voltage coupled from said variable tap for inactivating said AND gates and terminating said charging currents.

9. A constant current converter as set forth in claim 8 wherein said timing and control means further comprises a SCR connected between a first bridge of said diode bridges and said energy storage means, and a SCR connected between a last bridge of said diode bridges and said energy storage means, an electronic switch gated by an output of said first transformer coupled AND gate, a second transformer coupled AND gate responsive to an output of said electronic switch for activating said SCR's connected between said energy bank and said first and last diode bridges, and a high frequency trigger generator for providing gating pulses to said transformer coupled AND gates and said other AND gates.

10. A constant current converter as set forth in claim 9 and further comprising a current monitor resistance having a variable arm and connected between said first diode bridge and a grounded return side of said energy storage means, a transistor current sensor coupled to said variable arm for activation when excessive bridge current occurs, a monostable multivibrator responsive to said current sensor for activating said direct coupled amplifier to protect said converter system from excessive bridge currents.

11. A constant current converter as set forth in claim 10 and wherein said energy storage means is a capacitor energy bank and said voltage regulator further comprises a reference amplifier connected to said variable tap, a monostable multivibrator responsive to said reference amplifier for changing states when the amplifier reference level is exceeded for activating said direct coupled amplifier, a SCR switch and series connected capacitance connected across said last bridge, and a transformer connected to an output of said direct coupled amplifier for gating said SCR switch and thereby terminating said charging current by momentarily affording a current path bypassing said timing and control SCR's causing reset thereof.

12. A constant current converter as set forth in claim 11 wherein said plurality of diode bridges are four bridges, said last bridge being the fourth bridge; and said transistor delay switching means comprise first, second and third Schmidt triggers, and a transistor ramp generator resistively coupled to said Schmidt triggers and having a base timing capacitor responsive to an output of said electronic switch for activation thereof.

13. A constant current converter as set forth in claim 12 wherein said electronic switch is a SCR, and said high frequency trigger is a unijunction transistor oscillator.

14. A constant current converter as set forth in claim 7 wherein said timing and control means further comprises a SCR connected between a first bridge of said diode bridges and said energy storage means, and a SCR connected between a last bridge of said diode bridges and said energy storage means, an electronic switch gated by an output of said first transformer coupled AND gate, a second transformer coupled AND gate responsive to an output of said electronic switch for activating said SCR's connected between said energy bank and said first and last diode bridges, a high frequency trigger generator for providing gating pulses to said transformer coupled AND gates and said other AND gates, said transistor delay switching means comprises a plurality of Schmidt triggers, a transistor ramp generator resistively coupled to said Schmidt Triggers for sequential activation thereof and a timing capacitor in the base of said ramp generator responsive to an output of said electronic switch for activation thereof.

15. A constant current converter as set forth in claim 14 and further comprising a current monitor resistance having a variable arm and connected between said first diode bridge and a grounded return side of said energy storage means, a transistor current sensor coupled to said variable arm for activating when excessive bridge current occurs, a monostable multivibrator responsive to said current sensor for activating said voltage regulator means prior to full charge thereof to protect said converter system from excessive bridge currents.

* * * * *